(12) United States Patent
Pfadler

(10) Patent No.: US 12,273,226 B2
(45) Date of Patent: Apr. 8, 2025

(54) ACCESS NODE, USER EQUIPMENT, APPARATUS, METHOD AND COMPUTER PROGRAM FOR DETERMINING A DELAY-DOPPLER-RESOLUTION FOR A TRANSCEIVER OF A MOBILE COMMUNICATION SYSTEM

(71) Applicant: VOLKSWAGEN AKTIENGESELLSCHAFT, Wolfsburg (DE)

(72) Inventor: Andreas Pfadler, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 94 days.

(21) Appl. No.: 18/252,091

(22) PCT Filed: Jul. 1, 2021

(86) PCT No.: PCT/EP2021/068129
§ 371 (c)(1),
(2) Date: May 8, 2023

(87) PCT Pub. No.: WO2022/096163
PCT Pub. Date: May 12, 2022

(65) Prior Publication Data
US 2023/0412443 A1    Dec. 21, 2023

(30) Foreign Application Priority Data
Nov. 6, 2020    (DE) ............... 10 2020 213 999.7

(51) Int. Cl.
*H04L 27/26*    (2006.01)
(52) U.S. Cl.
CPC .............................. *H04L 27/2639* (2013.01)
(58) Field of Classification Search
CPC .................................................. H04L 27/2639
See application file for complete search history.

(56) References Cited

U.S. PATENT DOCUMENTS 6,658,045 B1 * 12/2003 Jin ................. H04B 1/7115
375/147
9,444,514 B2   9/2016 Hadani et al.
(Continued)

FOREIGN PATENT DOCUMENTS

DE    102011088225 A1    6/2013
WO    2017003952 A1    1/2017
WO    2017147439 A1    8/2017

OTHER PUBLICATIONS

Cohere Technologies, AT&T, CMCC, Deutsche Telekom, Telefonica, Telstra; OTFS Modulation Waveform and Reference Signals for New RAT; 3rd Generation Partnership Project (3GPP); Apr. 2016; vol. RAN WG1; Busan, South Korea.

(Continued)

*Primary Examiner* — David B Lugo
(74) *Attorney, Agent, or Firm* — Barnes & Thornburg LLP

(57) ABSTRACT

An access node, user equipment, an apparatus, method, and computer program for determining a delay-Doppler-resolution for a transceiver of a mobile communication system. The method for determining a delay-Doppler-resolution (DDR) for a transceiver of a mobile communication system includes determining information on properties of the transceiver, selecting the DDR from a database based on the information on the properties of the transceiver, and using the DDR for radio communication with the transceiver in the mobile communication system.

23 Claims, 4 Drawing Sheets

(56) References Cited

U.S. PATENT DOCUMENTS

| | | | |
|---|---|---|---|
| 2017/0054486 A1* | 2/2017 | Reial | H04W 72/23 |
| 2017/0078054 A1 | 3/2017 | Hadani et al. | |
| 2017/0149594 A1 | 5/2017 | Rakib et al. | |
| 2018/0205481 A1 | 7/2018 | Shlomo et al. | |
| 2018/0279246 A1* | 9/2018 | Gan | H04B 1/0475 |
| 2019/0238189 A1 | 8/2019 | Delfeld et al. | |
| 2020/0132850 A1 | 4/2020 | Crouch et al. | |
| 2020/0259692 A1 | 8/2020 | Hadani et al. | |
| 2023/0090593 A1* | 3/2023 | Kim | H04L 1/00 370/252 |

OTHER PUBLICATIONS

Office Action; Japanese Patent Application No. 2023-527124; Jun. 18, 2024.

Bello; Characterization of randomly time-variant linear channels; IEEE Transactions on Communications Systems; 1963; vol. 11, No. 4; pp. 360-393.

Gröchenig; Foundations of time-frequency analysis; 2013; Springer Science & Business Media.

Hadani et al.; Orthogonal time frequency space modulation; 2017 IEEE Wireless Communications and Network Conference (WCNC); IEEE; 2017; pp. 1-6.

Hadani et al.; Orthogonal Time Frequency Space (OTFS) modulation for millimeter-wave communications system; 2017 IEEE MMT-S International Microwave Symposium (IMS); Jun. 2017; pp. 681-683.

Jaeckel et al.; QuaDRiGA: A 3-D multi-cell channel model with time evolution for enabling virtual field trials; IEEE Transactions on Antennas and Propagation; 2014; vol. 62, No. 6; pp. 3242-3256.

Jung et al.; The WSSUS pulse design problem in multicarrier transmission; IEEE Transactions on Communications; 2007; vol. 55, No. 10; pp. 1918-1928.

Jung et al.; Robust path detection for the LTE downlink based on compressed sensing; 14th International OFDM Workshop; 2009; Hamburg.

Kozek; Matched Wey-Heisenberg expansions of nonstationary environments; 1996.

Kozek et al.; Nonorthogonal pulseshapes for multicarrier communications in doubly dispersive channels; IEEE Journal on Selected Areas in Communications; Oct. 1998; vol. 16, No. 8; pp. 1579-1589.

Liu et al.; Orthogonal time-frequency signaling over doubly dispersive channels; IEEE Transactions on Information Theory; 2004; vol. 50, No. 11; pp. 2583-2603.

Ma et al.; Fundamental limits of linear equalizers: diversity, capacity, and complexity; IEEE Transactions on Information Theory; 2008; vol. 54, No. 8; pp. 3442-3456.

Matz et al.; Analysis optimization, and implementation of low-interference wireless multicarrier systems; IEEE Transactions on Wireless Communications; 2007; vol. 6, No. 5; pp. 1921-1931.

Nimr et al.; Extended GFDM Framework: OTFS and GFDM Comparison; 2018 IEEE Global Communications Conference (GLOBECOM); Dec. 2018; pp. 1-6.

Pfadler et al.; Pulse-Shaped OTFS for V2X Short-Frame Communication with Tuned One-Tap Equalization; WSA 2020; 24th International ITG Workshop on Smart Antennas; 2020; pp. 1-6.

Průša et al.; The Large Time-Frequency Analysis Toolbox 2.0; Sound, Music, and Motion; LNCS; 2014; pp. 419-442; Springer International Publishing.

Ramachandran et al.; MIMO-OTFS in High-Doppler Fading Channels: Signal Detection and Channel Estimation; 2018 IEEE Global Communications Conference (GLOBECOM); Dec. 2018; pp. 206-212.

Rasool et al.; Biologically Inspired Processing of Radar Waveforms for Enhanced Delay-Doppler Resolution; IEEE Transactions on Signal Processing; Jun. 1, 2011; vol. 59, No. 6; pp. 2698-2709; IEEE Service Center, New York, NY.

Raviteja et al.; Orthogonal Time Frequency Space (OTFS) Modulation Based Radar System; 2019 IEEE Radar Conference (RADARCON); IEEE; Apr. 22, 2019; pp. 1-6.

Raviteja et al.; Practical Pulse-Shaping Waveforms for Reduced-Cyclic-Prefix OTFS; IEEE Transactions on Vehicular Technology; Jan. 2019; vol. 68, No. 1; pp. 957-961.

Raviteja et al.; Embedded Pilot-Aided Channel Estimation for OTFS in Delay-Doppler Channels; IEEE Transactions on Vehicular Technology; 2019; vol. 68, No. 5; pp. 4906-4917.

Thaj et al.; OTFS Model SDR Implementation and Experimental Study of Receiver Impairment Effects; 2019 IEEE International Conference on Communications Workshops (ICC Workshops); IEEE; May 20, 2019; pp. 1-6.

Wang et al.; Performance degradation of EFDM systems due to Doppler spreading; IEEE Transactions on Wireless Communications; 2006; vol. 5, No. 6; pp. 1422-1432.

Zemen et al.; Low-complexity equalization for orthogonal time and frequency signaling (OTFS); arXiv preprint arXiv; 2017; 1710.09916.

Zemen et al.; Iterative detection for orthogonal precoding in doubly selective channels; 2019 IEEE 29th Annual International Symposium on Personal, Indoor and Mobile Radio Communications (PIMRC); 2018; pp. 1-7.

International Search Report and Written Opinion; International Patent Application No. PCT/EP2021/068129; Oct. 11, 2021.

* cited by examiner

ACCESS NODE, USER EQUIPMENT, APPARATUS, METHOD AND COMPUTER PROGRAM FOR DETERMINING A DELAY-DOPPLER-RESOLUTION FOR A TRANSCEIVER OF A MOBILE COMMUNICATION SYSTEM

PRIORITY CLAIM

This patent application is a U.S. National Phase of International Patent Application No. PCT/EP2021/068129, filed 1 Jul. 2021, which claims priority to German Patent Application No. 10 2020 213 999.7, filed 6 Nov. 2020, the disclosures of which are incorporated herein by reference in their entireties.

SUMMARY

Illustrative embodiments relate to an access node, user equipment, an apparatus, method, and computer program for determining a delay-Doppler-resolution for a transceiver of a mobile communication system, more particularly, but not exclusively, to a concept for selecting a delay-Doppler-resolution from a database based on properties of a transceiver.

BRIEF DESCRIPTION OF THE DRAWINGS

Disclosed embodiments will be described with reference to the accompanying drawings, in which.

DETAILED DESCRIPTION

Figure 1:
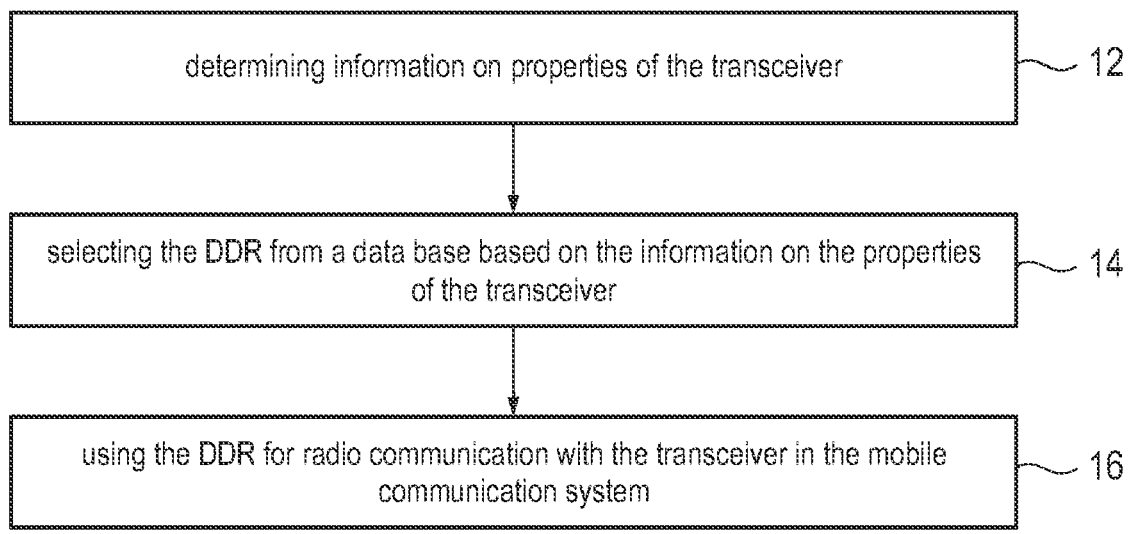
FIG. 1 shows a flow chart of an exemplary embodiment of a method for determining a delay-Doppler resolution for a transceiver of a mobile communication system.

New requirements in terms of reliability and efficiency in high mobility environments, such as vehicle-to-vehicle (V2V) communication, are pushing legacy systems to their limits. Orthogonal frequency-division multiplexing (OFDM) is a popular and well-known modulation scheme but it may suffer from substantial performance degradation and inflexibility in environments with high Doppler spreads. Consequently, novel modulation schemes may be considered and perused which are flexible, efficient and robust in doubly-dispersive channels.

Future vehicular communication systems require high reliability and efficiency under various mobility conditions. Furthermore, they are multilateral as different types of communication links exist. Transportation vehicles are connected to infrastructure, i.e., vehicle-to-infrastructure (V2I), but also using direct vehicle-to-vehicle (V2V) communication. Especially, V2V channels are distinct compared to conventional cellular channels. For communication between high mobility users, large Doppler shifts are expected due to the large relative velocity. Legacy systems, such as OFDM, may experience considerable performance degradation under high Doppler shifts. Further background can be found in T. Wang, J. G. Proakis, E. Masry, and J. R. Zeidler, "Performance degradation of OFDM systems due to Doppler spreading," IEEE Trans. on Wireless Commun., vol. 5, no. 6, pp. 1422-1432, 2006;

R. Hadani, S. Rakib, M. Tsatsanis, A. Monk, A. J. Goldsmith, A. F. Molisch, and R. Calderbank, "Orthogonal time frequency space modulation," in 2017 IEEE Wireless Commun. and Netw. Conf. (WCNC), pp. 1-6, IEEE, 2017;

R. Hadani, S. Rakib, A. F. Molisch, C. Ibars, A. Monk, M. Tsatsanis, J. Delfeld, A. Goldsmith, and R. Calderbank, "Orthogonal Time Frequency Space (OTFS) modulation for millimeter-wave communications systems," in 2017 IEEE MTT-S Int. Microwave Symp. (IMS), pp. 681-683, June 2017;

M. Kollengode Ramachandran and A. Chockalingam, "MIMO-OTFS in High-Doppler Fading Channels: Signal Detection and Channel Estimation," in 2018 IEEE Global Commun. Conf. (GLOBECOM), pp. 206-212, December 2018;

P. Raviteja, Y. Hong, E. Viterbo, and E. Biglieri, "Practical Pulse-Shaping Waveforms for Reduced-Cyclic-Prefix OTFS," IEEE Trans. on Vehicular Technol., vol. 68, no. 1, pp. 957-961, January 2019;

A. Nimr, M. Chafii, M. Matthe, and G. Fettweis, "Extended GFDM Framework: OTFS and GFDM Comparison," in 2018 IEEE Global Commun. Conf. (GLOBECOM), pp. 1-6, December 2018;

W. Kozek, "Matched Weyl-Heisenberg expansions of nonstationary environments," 1996;

K. Liu, T. Kadous, and A. M. Sayeed, "Orthogonal time-frequency signaling over doubly dispersive channels," IEEE Trans. on Inf. Theory, vol. 50, no. 11, pp. 2583-2603, 2004;

P. Jung and G. Wunder, "WSSUS pulse design problem in multicarrier transmission," IEEE Trans. on Commun., vol. 55, no. 10, pp. 1918-1928, 2007;

W. Kozek and A. F. Molisch, "Nonorthogonal pulseshapes for multicarrier communications in doubly dispersive channels," IEEE J. on Sel. Areas in Commun., vol. 16, no. 8, pp. 1579-1589, October 1998;

T. Zemen, M. Hofer, D. Loeschenbrand, and C. Pacher, "Iterative detection for orthogonal precoding in doubly selective channels," in 2018 IEEE 29th Annual Int. Symp. on Pers., Indoor and Mobile Radio Commun. (PIMRC), pp. 1-7, IEEE, 2018;

X. Ma and W. Zhang, "Fundamental limits of linear equalizers: diversity, capacity, and complexity," IEEE Trans. on Inf. Theory, vol. 54, no. 8, pp. 3442-3456, 2008;

T. Zemen, M. Hofer, and D. Loeschenbrand, "Low-complexity equalization for orthogonal time and frequency signaling (OTFS)," arXiv preprint arXiv:1710.09916, 2017;

A. Pfadler, P. Jung, and S. Stanczak, "Pulse-Shaped OTFS for V2X Short-Frame Communication with Tuned One-Tap Equalization," in WSA 2020; 24th Int. ITG Workshop on Smart Antennas, pp. 1-6, VDE, 2020;

Z. Pruša, P. L. Søndergaard, N. Holighaus, C. Wiesmeyr, and P. Balazs, "The Large Time-Frequency Analysis Toolbox 2.0," in Sound, Music, and Motion, LNCS, pp. 419-442, Springer Int. Publishing, 2014;

S. Jaeckel, L. Raschkowski, K. Börner, and L. Thiele, "QuaDRiGa: A 3-D multi-cell channel model with time evolution for enabling virtual field trials," IEEE Trans. on Antennas and Propag., vol. 62, no. 6, pp. 3242-3256, 2014;

R. Hadani and S. S. Rakib, "OTFS methods of data channel characterization and uses thereof," Sep. 13, 2016. U.S. Pat. No. 9,444,514;

K. Gröchenig, Foundations of time-frequency analysis. Springer Science & Business Media, 2013;

G. Matz, D. Schafhuber, K. Grochenig, M. Hartmann, and F. Hlawatsch, "Analysis, optimization, and implementation of low-interference wireless multicarrier systems," IEEE Trans. on Wireless Commun., vol. 6, no. 5, pp. 1921-1931, 2007;

P. Raviteja, K. T. Phan, and Y. Hong, "Embedded Pilot-Aided Channel Estimation for OTFS in Delay-Doppler Channels," IEEE Trans. on Vehicular Technol., vol. 68, no. 5, pp. 4906-4917, 2019;

P. Bello, "Characterization of randomly time-variant linear channels," IEEE Trans. on Commun. Syst., vol. 11, no. 4, pp. 360-393, 1963; and P. Jung, W. Schuele, and G. Wunder, "Robust path detection for the LTE downlink based on compressed sensing," in 14th Int. OFDM-Workshop, Hamburg, 2009.

New modulation schemes such as orthogonal time frequency and space (OTFS) address the challenges for future communication systems. The key idea behind OTFS is to multiplex a data symbol (e.g., QAM, quadrature amplitude modulation) in the signal representation called the delay-Doppler representation. OTFS is a potential candidate for 6G (6th Generation mobile communication system).

OTFS was introduced by Hadani et. al as a promising recent combination of classical pulse-shaped Weyl-Heisenberg (or Gabor) multicarrier schemes with a distinct time-frequency (TF) spreading. Data symbols are spread with the symplectic finite Fourier transform (SFFT) over the whole time-frequency grid. This particular linear pre-coding accounts for the doubly-dispersive nature of time-varying multipath channels seen as linear combinations of time-frequency shifts. Several studies show that OTFS outperforms OFDM in such situations. Other research focus on a performance comparison of OFDM, generalized frequency division multiplexing (GFDM), and OTFS. It reveals significant benefits of OTFS in terms of bit error rate (BER) and frame error rate (FER) in relation to the others. With sufficient accurate channel information it offers a promising increase in terms of reliability and robustness for high mobility users when using sophisticated equalizers. So far, OTFS was researched with the assumption of perfect grid-matching, often with idealized pulses violating the uncertainty principle and in many cases with ideal channel knowledge (including the cross-talk channel coefficients).

OTFS is a new modulation scheme that addresses the challenges of 5th Generation mobile communication systems (5G). The key idea behind OTFS is to multiplex a QAM (quadrature amplitude modulation) or QPSK (Quadrature Phase Shift Keying) symbol (data) in the delay-Doppler signal representation. To do channel equalization, the wireless channel needs to be estimated at the receiver. This can be done by the insertion of pilots at the transmitter. The a-priory known pilot tones can be used by the receiver to estimate the channel.

Document US 2020/0259692 A1 discloses Orthogonal Time Frequency Space (OTFS) as a novel modulation scheme with significant benefits for 5G systems. The fundamental theory behind OTFS is presented in this paper as well as its benefits. A mathematical description of the doubly fading delay-Doppler channel is provided and a modulation that is tailored to this channel is developed. The time varying delay-Doppler channel in the time-frequency domain is modelled and a new domain (the OTFS domain) is derived where it is shown that the channel is transformed to a time invariant one and all symbols see the same SNR. Properties of the modulation like delay and Doppler resolution are explored, and design and implementation issues like multiplexing multiple users and evaluating complexity are addressed. Performance results are presented which demonstrate the superiority of OTFS.

Document US 2017/0149594 A1 describes a system and method for orthogonal time frequency space communication and waveform generation. The method includes receiving a plurality of information symbols and encoding an N×M array containing the plurality of information symbols into a two-dimensional array of modulation symbols by spreading each of the plurality of information symbols with respect to both time and frequency. The two-dimensional array of modulation symbols is then transmitted using M mutually orthogonal waveforms included within M frequency sub-bands.

It is therefore a challenge to specify configurations for an air interface that takes into account different radio channel characteristics. There is a demand for an improved concept for radio link configurations.

This demand is accommodated by the subject-matter of the independent claims.

Disclosed embodiments are based on the finding that a delay-Doppler-resolution, DDR, can be selected from a predefined set of DDRs that can be stored in a database. Based on properties of the transceiver an appropriate DDR can be selected.

Disclosed embodiments provide a method for determining a delay-Doppler-resolution, DDR, for a transceiver of a mobile communication system. The method comprises determining information on properties of the transceiver and selecting the DDR from a database based on the information on the properties of the transceiver. The method further comprises using the DDR for radio communication with the transceiver in the mobile communication system. Disclosed embodiments enable adaptation of a DDR to properties of a transceiver.

The method may further comprise determining information on a communication performance of the radio communication. Disclosed embodiments may enable continuous improvement or adaptation of DDR based on tracked radio performance.

In some exemplary embodiments, the method may further comprise improving the DDR based on the radio performance and updating the database. Continuously adapting the database may make database updates commonly available such that multiple transceivers can contribute and benefit.

For example, artificial intelligence or machine learning may be used for improving the DDR based on the radio performance. Disclosed embodiments may enable enhanced and adaptive radio performance.

The information on the communication performance may comprise information on a quality of service on the radio link. A quality of service may be continuously improved in exemplary embodiments.

The information on a communication performance may comprise information on a diversity gain on the radio link for the DDR. The DDR may determine how many multipaths of the radio channel can be resolved and may therefore determine a potential diversity gain.

For example, the radio communication uses orthogonal time frequency and space, OTFS, multiplexing. Disclosed embodiments may enable highly efficient radio communication.

The information on the properties may comprise information on a velocity of the transceiver. The velocity of the transceiver may be an efficient measure to determine potential Doppler shifts in the radio channel.

The information on the properties may comprise information on a geographical position of the transceiver. Based on the geographical position former channel properties for the position may be considered.

For example, the information on the properties comprises information on a predicted trajectory of the transceiver. The predicted trajectory may serve as a basis for predicting radio channel properties for DDR adaption.

The information on the properties may comprise information on a transmitter and/or receiver setup of the transceiver. Different setups or capabilities of the transceivers communicating on a radio link may be taken into account in exemplary embodiments.

The method may further comprise scheduling time and frequency resources to the transceiver, and the selecting may further comprise selecting the DDR based on the time and frequency resources. Communication efficiency may be further improved in exemplary embodiments by further adapting the DDR to scheduled radio resources.

In some disclosed embodiments, the method may further comprise receiving user data from the transceiver, the user data at least partly comprises the information on the properties. Disclosed embodiments may consider data provided by a user, e.g., on radio and/or processing capabilities, for selecting the DDR.

Another exemplary embodiment is a computer program having a program code for performing at least one of the methods described herein, when the computer program is executed on a computer, a processor, or a programmable hardware component.

An apparatus for determining a delay-Doppler-resolution, DDR, for a transceiver of a mobile communication system is another exemplary embodiment. The apparatus comprises a transceiver module for communicating in the mobile communication system and a processing module configured to perform one of the methods described herein. Further exemplary embodiments are an access node of a wireless communication system comprising the apparatus and user equipment for a wireless communication system comprising the apparatus.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular exemplary embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Disclosed embodiments of the present disclosure relate to wireless communication devices, such as a base station and a mobile transceiver, and to corresponding methods, apparatuses and computer programs. In the following, two wireless communication devices, i.e., wireless transceivers, may be assumed that communicate with each other, e.g., two mobile transceivers or a base station and a mobile transceiver. This communication is usually performed using wireless transmissions that are exchanged between the two wireless communication devices over a (wireless) channel. In at least some exemplary embodiments, the channel may be assumed to be a doubly-dispersive channel.

The communication may be performed using so-called data frames, which may be considered to be transmitted in a time frequency plane (mapped or transformed into the time domain to obtain a transmit signal) using one or more time slots and using one or more carrier frequencies, wherein the time slots span across the time dimension of the time-frequency plane, and wherein the carrier frequencies span across the frequency dimension of the time-frequency plane. This time-frequency plane can be used to model a (logical) grid that spans via the time dimension and the frequency dimension. This is a logical construct, which is, during transmission of the data frames, mapped to the time slots and carrier frequencies. In general, this grid in the time-frequency plane is delimited by the bandwidth range being used to transmit the data frame, and by the time that is used to transmit the frame (the time being subdivided into the one or the plurality of time slots). Accordingly, in exemplary embodiments, each data frame being transmitted via a wireless communication link may be transmitted based on a two-dimensional grid in a time-frequency plane having a time dimension resolution and a frequency dimension resolution.

Grids (in the time-frequency plane and in the delay-Doppler plane) may be used to represent the signals. In multicarrier transmission-based wireless communication systems, computationally feasible equalizers may suffer from mismatched time-frequency grids. Parity may be achieved with perfect gird matching of the Gabor synthesis and analysis pulses with the delay and Doppler spread of the channel. However, this might not be achieved in practice due to the varying mobility of users, and correspondingly changing channels. This may lead to performance degradation (higher error rates). In many cases, this may be caused by a mismatch of the grid, as perfect grid matching is assumed in theoretical studies on multicarrier transmission-based wireless communication systems, such as OTFS, OFDM and FBMC. Unfortunately, grid mismatch may cause significant performance degradation.

To obtain an improved performance, a time resolution and frequency resolution for the grid in the time-frequency plane that matches the channel that is used for the communication between the wireless communication devices may be chosen. Such a time resolution and frequency resolution for the grid in the time-frequency plane that matches the channel that is used for the communication between the wireless communication devices may be denoted an ideal time-frequency-grid configuration for the communication over the wireless communication link. For example, in different scenarios, signals transmitted via the channel may experience different amounts of delay spread and Doppler spread. To account for such different channels, the grid may be chosen such that the respective properties of the channel are taken into account. For lower relative velocities, less resolution in the time domain may be required, and a higher resolution in the frequency domain may be desired if higher delays occur. For example, at higher relative velocities, a grid having a higher resolution (i.e., more points) in the time dimension may be beneficial (to allow for a higher Doppler spread), while at lower relative velocities, a grid having a higher resolution (i.e., more points) in the frequency dimension may be beneficial.

FIG. 1 shows a block diagram of a method 10 for determining a delay-Doppler-resolution, DDR, for a transceiver of a mobile communication system. The method 10 comprises determining 12 information on properties of the transceiver and selecting 14 the DDR from a database based on the information on the properties of the transceiver. The method 10 further comprises using 16 the DDR for radio communication with the transceiver in the mobile communication system.

Figure 2:
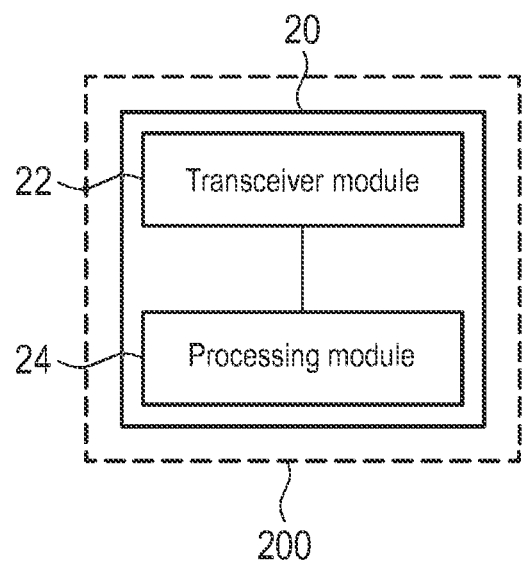
FIG. 2 shows a block diagram of an exemplary embodiment of an apparatus for determining a delay-Doppler resolution for a transceiver of a mobile communication system.

FIG. 2 shows a block diagram of an exemplary embodiment of an apparatus 20 for determining a delay-Doppler resolution for a transceiver 200 of a mobile communication system. The apparatus 20 comprises a transceiver module 22 for communicating in the mobile communication system and a processing module 24, which is coupled to the transceiver module 22, and which is configured to perform at least one of the methods described herein. FIG. 2 also shows an exemplary embodiment of a transceiver 200 comprising the apparatus 20. The transceiver 200 may be an access node, a base station, user equipment, a mobile station, etc.

The transceiver module 22 may correspond to one or more inputs and/or outputs for receiving and/or transmitting information, which may be in digital (bit) values according to a specified code, within a module, between modules or between modules of different entities. For example, the transceiver module 22 may comprise interface circuitry configured to receive and/or transmit information. In disclosed embodiments the transceiver module 22, may correspond to any method or mechanism for obtaining, receiving, transmitting or providing analog or digital signals or information, e.g., any connector, contact, pin, register, input port, output port, conductor, lane, etc. which allows providing or obtaining a signal or information. The transceiver module may communicate in a wireless or wireline manner and it may be configured to communicate, i.e., transmit and/or receive signals, information with further internal or external components. The transceiver module 22 may comprise further components to enable according communication in the mobile communication system 300, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc.

The transceiver module 22 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the transceiver module 22 may serve the purpose of transmitting or receiving or both, transmitting and receiving, information The processing module 24 may be implemented using one or more processing units, one or more processing devices, any method or mechanism for processing, such as a processor, a computer or a programmable hardware component being operable with accordingly adapted software. In other words, the described function of the control/processing module 24 may as well be implemented in software, which is then executed on one or more programmable hardware components. Such hardware components may comprise a general-purpose processor, a Digital Signal Processor (DSP), a micro-controller, etc.

The transceiver 200 may be a base station, a relay station or a mobile device of a mobile communication system. A base station or base station transceiver can be operable to communicate with one or more active mobile transceivers and a base station transceiver can be located in or adjacent to a coverage area of another base station transceiver, e.g., a macro cell base station transceiver or small cell base station transceiver. Hence, disclosed embodiments may provide a mobile communication system comprising one or more mobile transceivers and one or more base station transceivers, wherein the base station transceivers may establish macro cells or small cells, as e.g., pico-, metro-, or femto cells. A mobile transceiver may correspond to a smartphone, a cell phone, user equipment, radio equipment, a mobile, a mobile station, a laptop, a notebook, a personal computer, a Personal Digital Assistant (PDA), a Universal Serial Bus (USB)-stick, a car, a mobile relay transceiver for D2D communication, etc. A mobile transceiver may also be referred to as User Equipment (UE) or mobile in line with the 3GPP (Third Generation Partnership Project) terminology.

A base station transceiver can be located in the fixed or stationary part of the network or system. A base station transceiver may correspond to a remote radio head, a transmission point, an access point, radio equipment, a macro cell, a small cell, a micro cell, a femto cell, a metro cell etc. A base station transceiver may correspond to a base station understood as a logical concept of a node/entity terminating a radio bearer or connectivity over the air interface between a terminal/mobile transceiver and a radio access network. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a transmission point, a relay transceiver etc., which may be further subdivided in a remote unit and a central unit.

A mobile transceiver can be associated, camped on, or registered with a base station transceiver or cell. The term cell refers to a coverage area of radio services provided by a base station transceiver, e.g., a NodeB (NB), an eNodeB (eNB), a remote radio head, a transmission point, etc. A base station transceiver may operate one or more cells on one or more frequency layers, in some exemplary embodiments a cell may correspond to a sector. For example, sectors can be achieved using sector antennas, which provide a characteristic for covering an angular section around a remote unit or base station transceiver. In some exemplary embodiments, a base station transceiver may, for example, operate three or six cells covering sectors of 120° (in case of three cells), 60° (in case of six cells) respectively. A base station transceiver may operate multiple sectorized antennas. In the following, a cell may represent an according base station transceiver generating the cell or, likewise, a base station transceiver may represent a cell the base station transceiver generates.

The mobile communication system may, for example, correspond to one of the Third Generation Partnership Project (3GPP)—standardized mobile communication networks, where the term mobile communication system is used synonymously to mobile communication network. The mobile or wireless communication system may correspond to a mobile communication system of the 5th Generation (5G) and/or 6th Generation (6G) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Time-Frequency and Space (OTFS) system, an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

In the following, an OTFS system will be described in an exemplary embodiment. The bandwidth of the transmission $B=M\Delta f$ is inversely proportional to the delay resolution $\Delta\tau$ and the duration of the transmission $T=N\Delta t$ is inversely proportional to the Doppler resolution $\Delta\upsilon$.

Figure 3:
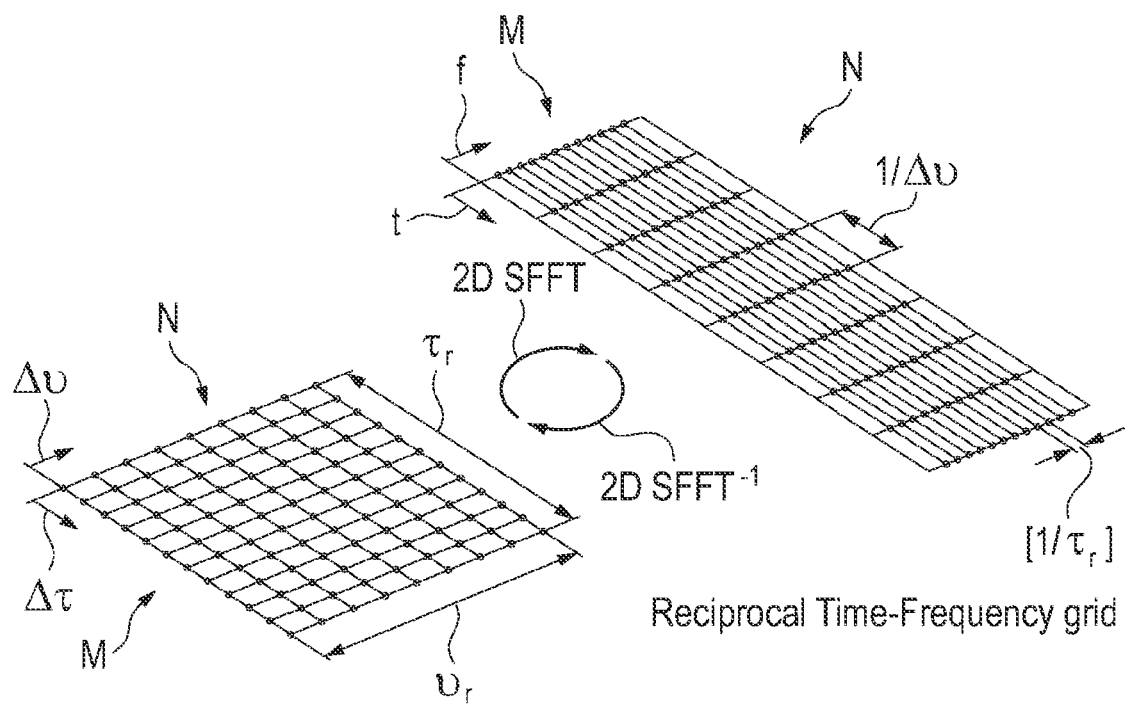
FIG. 3 illustrates an exemplary embodiment using orthogonal time-frequency-and-space transformations.

Doppler resolution: $\Delta\upsilon=1/T$,
Delay resolution: $\Delta\tau=1/B$, where N is the number of time (in the TF (Time-Frequency) domain) or Doppler (in the DD (delay-Doppler) domain) symbols and M is the number of subcarriers (in the TF domain) or delay (in the DD domain) symbols. This is illustrated in FIG. 3. FIG. 3 illustrates an exemplary embodiment using orthogonal time-frequency-and-space transformations. FIG. 3 shows a M×N DD-grid, the delay resolution is $M\Delta\tau$ and the Doppler resolution is $N\Delta\upsilon$. A two-dimensional simplectic FastFourier-Transformation (2D SFFT) can be used to transform between the Time-Frequency (TF) and the DD domains. FIG. 3 shows the corresponding N×M TF grid with a frequency resolution of $1/(M\Delta\tau)$ and a time resolution of $1/(N\Delta\upsilon)$.

As an example, a time frequency product of TF=1 and N=M=64 can be defined, with a filter bank length of L=4096. Different to the so-called mobility modes, for which details will be provide subsequently, the bandwidth and hence the Doppler resolution may be changing. According to the above with respect to the mobility modes, the self-interference is reduced but the delay-Doppler resolution is the same for each mobility mode.

Disclosed embodiments may find an ideal or improved Doppler-and-delay resolution to enable the highest/improved diversity gain of OTFS. To capture the geometry of the channel and obtain the highest diversity gain, the best/improved Doppler and delay resolution may be selected. Note that diversity refers to the number of multipath components separable in either the delay or Doppler dimension. Disclosed embodiments may enable a communication system to find/select ideal or improved delay-Doppler resolutions (DDR). In the following exemplary embodiment, the radio communication uses orthogonal time frequency and space, OTFS, multiplexing.

Figure 4:
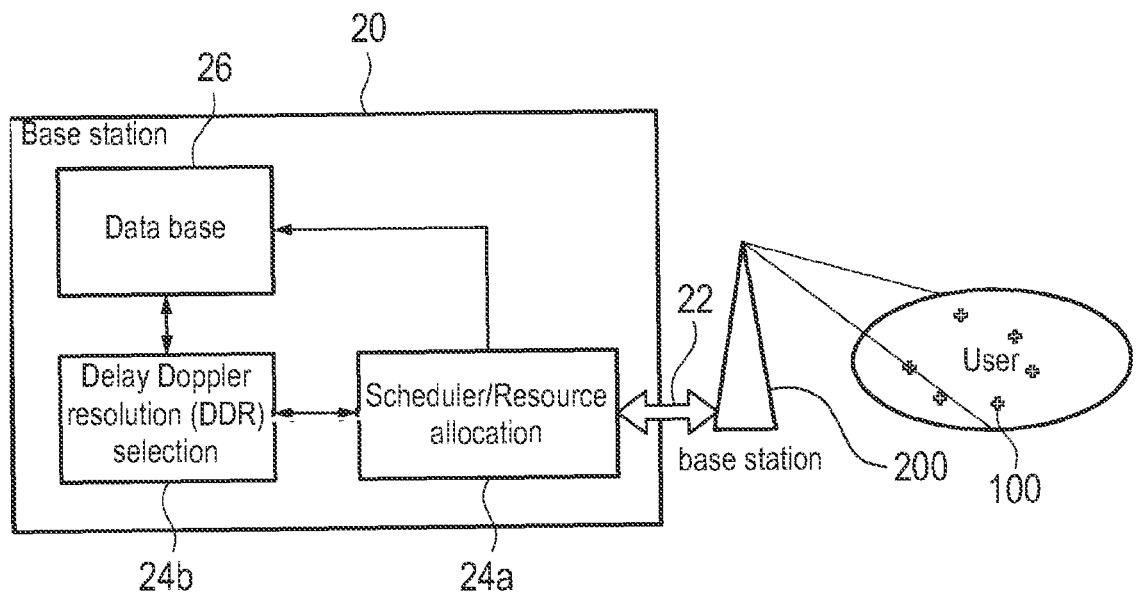
FIG. 4 illustrates an exemplary embodiment for delay-Doppler resolution selection at a base station of a mobile communication system.

FIG. 4 illustrates an exemplary embodiment for delay-Doppler resolution selection at a base station 200 of a mobile communication system 300. The base station serves multiple users in a cell and comprises an exemplary embodiment of the above apparatus 20. Its processing module 24 comprises a scheduler/resource allocation module 24a and a DDR selection module 24b. In further exemplary embodiments, these may be implemented as part or outside the processing module 24. Moreover, the apparatus 20 comprises a database 26, which may comprise any storage or memory. In this disclosed embodiment, the base station 200 learns the best DDR for distinct user properties, communication scenarios and environments. One can determine the ideal/improved DDR using the modules as shown in FIG. 4. The core component is the DDR selection module 24b. Furthermore, the interactions between the modules are explained in more detail:

Database module 26:

I. The database 26 may store or maintain a geographical 3-D radio map.

II. The database 26 may store user data such as user velocity, used DDR geographical position, characteristics of the TX and RX setup (e.g., position, type and number of antennas), etc.

III. The database 26 may further store information on obtained performance, e.g., achieved bit-error-rate (BER), throughput, frame-error rate (FER), diversity order, etc.

IV. The database 26 may provide a mapping of user properties (II.) to the performance information III., e.g., with the support of some artificial intelligence (AI) and/or machine learning (ML) and the mapping may be stored in the 3D map (I.).

The DDR selection module 24b:

I. The DDR selection 24b may be configured to determine user properties. For example, the method 10 may comprise receiving user data from the transceiver. The user data may at least partly comprise the information on the properties.

a. User has certain velocity as well as predicted or known future velocity (e.g., transportation vehicle trajectories). The information on the properties comprises information on a velocity of the transceiver. The information on the properties may comprise information on a predicted trajectory of the transceiver.

b. Geographical position as well as predicted or known future position (e.g., transportation vehicle trajectories). The information on the properties comprises information on a geographical position of the transceiver.

c. Characteristics of the TX and RX setup. The information on the properties may comprise information on a transmitter and/or receiver setup of the transceiver.

II. The DDR selection 24b may be configured to select a (improved/ideal) DDR based on information from the database 26.

III. The DDR selection 24b may be configured to provide feedback on the performance and update the database 26. The method 10 comprises determining information on a communication performance of the radio communication. The DDR may hence be improved over time based on the radio performance and updating the database. Artificial intelligence can be used for improving the DDR selection based on the radio performance. For example, the information on the communication performance comprises information on a quality of service on the radio link. The information on a communication performance may comprise information on a diversity gain on the radio link for the DDR. Such information may be useful in improving DDR selection.

The scheduler and resource allocation module 24a:

I. The scheduler and resource allocation 24a may be configured to work as a standard scheduler.

II. The scheduler and resource allocation 24a may be configured to receive user data.

III. The scheduler and resource allocation 24a may be configured to store user data at the database 26.

IV. The scheduler and resource allocation 24a may be configured to request the ideal DDR from "DDR selection" module for a specific user (and alternative DDR).

V. The scheduler and resource allocation 24a may be configured to assign the DDR to the specific user based on the ideal DDR and the availability of resources. In this disclosed embodiment, the method 10 further comprises scheduling time and frequency resources to the transceiver, and the selecting 14 further comprises selecting the DDR based on the time and frequency resources.

The wireless communication link is used by the transceivers (base stations and UEs) to transmit wireless messages. At both ends, the communication over the wireless communication link may be based on the knowledge which configuration (or the plurality of predefined configurations) is being used by the other end for transmitting and receiving wireless messages over the wireless communication link (with the configuration used for transmitting and receiving is the same, or with different configurations being used for transmitting and receiving). Therefore, if one of the transceivers decides to switch to one of the alternative configurations, the other transceiver may be notified of the switch to the other configuration. In other words, the method may comprise notifying, before switching the configuration, the other of the first and second transceiver, of the impending switch of the configuration. For example, a notification message may be transmitted over the wireless communication link to the other transceiver to notify the other transceiver.

Disclosed embodiments may be compliant to or even comprised in certain standard specifications, such as those specified by the 3GPP. Configuration information may for example, be communicated using signaling radio bearers, e.g., by Radio Resource Control (RRC) messages, which are, for example, specified in the *.331 series of 3GPP as layer 3 control plane messages. For example, physical layer specification, e.g., by DDRs and other physical layer specifications may also be affected by present exemplary embodiments, e.g., *.201, *.211, *.212, *.213, *.214, *.216 series in the 3GPP specifications.

At least some examples are based on using a machine-learning model or machine-learning algorithm. Machine learning refers to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. For the machine-learning model to analyze the content of an image, the machine-learning model may be trained using training images as input and training content information as output. By training the machine-learning model with a large number of training images and associated training content information, the machine-learning model "learns" to recognize the content of the images, so the content of images that are not included of the training images can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model.

Machine-learning models are trained using training input data. The examples specified above use a training method called "supervised learning". In supervised learning, the machine-learning model is trained using a plurality of training samples, wherein each sample may comprise a plurality of input data values, and a plurality of desired output values, i.e., each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm, e.g., a classification algorithm, a regression algorithm or a similarity learning algorithm. Classification algorithms may be used when the outputs are restricted to a limited set of values, i.e., the input is classified to one of the limited set of values. Regression algorithms may be used when the outputs may have any numerical value (within a range). Similarity learning algorithms are similar to both classification and regression algorithms, but are based on learning from examples using a similarity function that measures how similar or related two objects are.

Apart from supervised or semi-supervised learning, unsupervised learning may be used to train the machine-learning model. In unsupervised learning, (only) input data might be supplied, and an unsupervised learning algorithm may be used to find structure in the input data, e.g., by grouping or clustering the input data, finding commonalities in the data. Clustering is the assignment of input data comprising a plurality of input values into subsets (clusters) so that input values within the same cluster are similar according to one or more (predefined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

In general, a Long-Short-Term-Memory (LSTM) may be trained using a supervised learning algorithm, as the LSTM learns by specifying a training sample and a desired output, using techniques like gradient descent to find a combination of weights within the LSTM that is most suitable for generating the desired transformation. In the proposed concept, spreading functions may be provided at the input of the LSTM, and a desired weighting of the spreading functions may be provided as desired output. Alternatively or additionally, the training may be embedded in a reinforcement learning-based approach, where the weighting is changed using reinforcement learning based on a reward function that is based on a divergence between the predicted SINR and the actual SINR (e.g., as measured or as simulated). In various examples, the LSTM may be trained for time-series prediction, e.g., by using historic time-series data (of the spreading function), providing a window of samples of the time-series data (i.e., a sequence of spreading functions) as training samples and a subsequent sample (i.e., a subsequent spreading function) as desired output.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge, e.g., based on the training performed by the machine-learning algorithm. In disclosed embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e., to achieve a desired output for a given input. In at least some disclosed embodiments, the machine-learning model may be deep neural network, e.g., a neural network comprising one or more layers of hidden nodes (i.e., hidden layers), optionally a plurality of layers of hidden nodes.

Alternatively, the machine-learning model may be a support vector machine. Support vector machines (i.e., support vector networks) are supervised learning models with associated learning algorithms that may be used to analyze data, e.g., in classification or regression analysis. Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

In the following, a more detailed instruction to mobility modes according to an example is given.

Orthogonal time frequency and space (OTFS) modulation is a pulse-shaped Gabor signaling scheme with additional time-frequency (TF) spreading using the symplectic finite Fourier transform (SFFT). With a sufficient amount of accurate channel information and sophisticated equalizers, it promises performance gains in terms of robustness for high mobility users. To fully exploit diversity in OTFS, the 2D-deconvolution implemented by a linear equalizer should approximately invert the doubly dispersive channel operation, which however is a twisted convolution. In theory, this is achieved in a first operation by matching the TF grid and the Gabor synthesis and analysis pulses to the delay and Doppler spread of the channel. However, in practice, one always has to balance between supporting high granularity in delay-Doppler (DD) spread, and multi-user and network properties.

Mobility modes are proposed with distinct grid and pulse matching for different doubly dispersive channels. To account for remaining self-interference, the minimum mean square error (MMSE) linear equalizer may be tuned without the need of estimating channel cross-talk coefficients. The proposed approach was evaluated with the QuaDRiGa channel simulator and with OTFS transceiver architecture based on a polyphase implementation for orthogonalized Gaussian pulses. In addition, OTFS is compared to a IEEE 802.11p compliant design of cyclic prefix (CP) based orthogonal frequency-division multiplexing (OFDM). The results indicate that with an appropriate mobility mode, the potential OTFS gains can be indeed achieved with linear equalizers to significantly outperform OFDM.

Strict requirements on reliability and efficiency in high mobility communication scenarios, such as vehicle-to-everything (V2X) communication, are pushing legacy systems to their limits. Orthogonal frequency-division multiplexing (OFDM) is a widely-used modulation scheme which however suffers substantial performance degradation and inflexibility in scenarios with high Doppler spreads. See T. Wang, J. G. Proakis, E. Masry, and J. R. Zeidler, "Performance degradation of OFDM systems due to Doppler spreading," IEEE Trans. on Wireless Commun., vol. 5, no. 6, pp.

1422-1432, 2006. Consequently, there is a need for the development of novel modulation schemes that are flexible, efficient and robust in doubly dispersive channels.

An orthogonal time frequency and space (OTFS) waveform is introduced by Hadani et. al (see R. Hadani, S. Rakib, M. Tsatsanis, A. Monk, A. J. Goldsmith, A. F. Molisch, and R. Calderbank, "Orthogonal time frequency space modulation," in 2017 IEEE Wireless Commun. and Netw. Conf. (WCNC), pp. 1-6, IEEE, 2017) as a promising combination of classical pulse-shaped Weyl-Heisenberg (or Gabor) multicarrier schemes with a distinct time-frequency (TF) spreading. Data symbols are spread with the symplectic finite Fourier transform (SFFT) over the whole TF grid. This particular linear pre-coding accounts for the doubly dispersive nature of time-varying multipath channels seen as linear combinations of TF shifts. Several studies show that OTFS outperforms OFDM in such situations (see R. Hadani, S Rakib, A. F. Molisch, C. Ibars, A. Monk, M. Tsatsanis, J. Delfeld, A. Goldsmith, and R. Calderbank, "Orthogonal Time Frequency Space (OTFS) modulation for millimeterwave communications systems," in 2017 IEEE MTT-S Int. Microwave Symp. (IMS), pp. 681-683, June 2017, M. Kollengode Ramachandran and A. Chockalingam, "MIMO-OTFS in High-Doppler Fading Channels: Signal Detection and Channel Estimation," in 2018 IEEE Global Commun. Conf. (GLOBECOM), pp. 206-212, December 2018, and P. Raviteja, Y. Hong, E. Viterbo, and E. Biglieri, "Practical Pulse-Shaping Waveforms for Reduced-Cyclic-Prefix OTFS," IEEE Trans. on Vehicular Technol., vol. 68, no. 1, pp. 957-961, January 2019. Another research work focuses on a performance comparison of OFDM, generalized frequency division multiplexing (GFDM), and OTFS. See A. Nimr, M. Chafii, M. Matthe, and G. Fettweis, "Extended GFDM Framework: OTFS and GFDM Comparison," in 2018 IEEE Global Commun. Conf. (GLOBECOM), pp. 1-6, December 2018. It reveals significant benefits of OTFS in terms of bit error rate (BER) and frame error rate (FER) in relation to the others. However, so far research has mainly focused on OTFS with the assumption of perfect grid matching and often with idealized pulses, violating the uncertainty principle. In many cases, ideal channel knowledge is assumed, including the cross-talk channel coefficients.

Different doubly dispersive communication channels provide distinct delay-Doppler (DD) spread and diversity characteristics. Particular single dispersive cases therein are time or frequency-invariant channels, which boil down to simple frequency or time division communication schemes, respectively. For some high mobility scenarios, the channel becomes dispersive in both time and frequency domain. Especially, V2X channels differ in their dissipation in both domains. Depending on the communication scenario, a distinct spreading region is spanned:

$$U := \left[0, \frac{\tau}{B}\right] \times \left[-\frac{vB}{L}, \frac{vB}{L}\right]$$

where B, L, v, and τ are the bandwidth, signal length, Doppler, and delay spread, respectively. To cope with doubly dispersive channels, the synthesis pulse used at the transmitter, the analysis pulse used at the receiver, and their TF grid may match U. See W. Kozek, "Matched Weyl-Heisenberg expansions of nonstationary environments," 1996, K. Liu, T. Kadous, and A. M. Sayeed, "Orthogonal time-frequency signaling over doubly dispersive channels," IEEE Trans. on Inf. Theory, vol. 50, no. 11, pp. 2583-2603, 2004, and P. Jung and G. Wunder, "WSSUS pulse design problem in multicarrier transmission," IEEE Trans. on Commun., vol. 55, no. 10, pp. 1918-1928, 2007. A common way is to design the ratio of time and frequency shifts T and F as well as TF spreads $\sigma_t$ and $\sigma_f$ of the Gabor pulses with respect to the channel scattering function under the wide-sense stationary uncorrelated scattering (WSSUS) assumption:

$$\frac{T}{F} = \frac{\sigma_t}{\sigma_f} \stackrel{!}{=} \frac{\tau_{max}}{2v_{max}} \tag{1}$$

where $$\frac{\tau_{max}}{2v_{max}}$$

is the ratio between the maxima of the delay and the Doppler spread of the channel. This approach is referred to as pulse and grid matching. See W. Kozek, "Matched Weyl-Heisenberg expansions of nonstationary environments," 1996, W. Kozek and A. F. Molisch, "Nonorthogonal pulseshapes for multicarrier communications in doubly dispersive channels," IEEE J. on Sel. Areas in Commun., vol. 16, no. 8, pp. 1579-1589, October 1998, and K. Liu, T. Kadous, and A. M. Sayeed, "Orthogonal time-frequency signaling over doubly dispersive channels," IEEE Trans. on Inf. Theory, vol. 50, no. 11, pp. 2583-2603, 2004, and P. Jung and G. Wunder, "WSSUS pulse design problem in multicarrier transmission," IEEE Trans. on Commun., vol. 55, no. 10, pp. 1918-1928, 2007. With the goal of satisfying the condition of pulse and grid matching in (1), distinct mobility modes are proposed and investigated.

For coherent communication, the doubly dispersive channel operation may be estimated and inverted at the receiver. In general, linear equalizer are favored for channel equalization, since they have a lower complexity compared to e.g., maximum-likelihood equalizer (MLE) or iterative techniques such as interference cancellation. See T. Zemen, M. Hofer, D. Loeschenbrand, and C. Pacher, "Iterative detection for orthogonal precoding in doubly selective channels," in 2018 IEEE 29th Annual Int. Symp. on Pers., Indoor and Mobile Radio Commun. (PIMRC), pp. 1-7, IEEE, 2018. Although MLE enjoys the maximum diversity, in some cases linear equalizer can achieve the same diversity gain as MLE (see X. Ma and W. Zhang, "Fundamental limits of linear equalizers: diversity, capacity, and complexity," IEEE Trans. on Inf. Theory, vol. 54, no. 8, pp. 3442-3456, 2008), for example, in the case of non-singular convolutions. In T. Zemen, M. Hofer, and D. Loeschenbrand, "Low-complexity equalization for orthogonal time and frequency signaling (OTFS)," arXiv preprint arXiv:1710.09916, 2017, it has been observed that in most cases full OTFS diversity is not achieved when using a common minimum mean square error (MMSE) equalization. On the contrary, MLE or interference cancellation techniques for OTFS are complex and also require accurate estimation of the cross-talk channel coefficients. Indeed, the remaining self-interference caused by suboptimal pulse and grid matching may be estimated and taken into account at the equalizer. A linear equalizer which accounts for self-interference on a frame base was introduced in. See A. Pfadler, P. Jung, and S. Stanczak, "Pulse-Shaped OTFS for V2X Short-Frame Communication with Tuned One-Tap Equalization," in WSA 2020; 24th Int.

ITG Workshop on Smart Antennas, pp. 1-6, VDE, 2020. This approach is used in the presented work to account for the remaining self-interference.

In this section, mobility modes are proposed that control the self-interference on a coarse level and to instantaneously tune the linear MMSE equalizer by estimating from pilot and guard symbols the remaining self-interference power. The main focus of this section can be summarized as follows:

- OTFS is studied from the perspective of the pulse-shaped Gabor signaling with additional TF spreading, implemented using the MATLAB toolbox LTFAT. See Z. Pruša, P. L. Søndergaard, N. Holighaus, C. Wiesmeyr, and P. Balazs, "The Large Time-Frequency Analysis Toolbox 2.0," in Sound, Music, and Motion, LNCS, pp. 419-442, Springer Int. Publishing, 2014,
- Doubly dispersive vehicular channels are considered in a concrete geometry-based scenario generated by the QuaDRiGa channel simulator (see S. Jaeckel, L. Raschkowski, K. Börner, and L. Thiele, "QuaDRiGa: A 3-D multi-cell channel model with time evolution for enabling virtual field trials," IEEE Trans. on Antennas and Propag., vol. 62, no. 6, pp. 3242-3256, 2014) using pilot-based channel estimation as in R. Hadani and S. S. Rakib, "OTFS methods of data channel characterization and uses thereof," Sep. 13, 2016. U.S. Pat. No. 9,444,514,
- Mobility modes are proposed with distinct pulse and grid matching, and
- The impact of the remaining self-interference in the equalizer due to imperfect 2D-deconvolution of the twisted convolution affected by grid and pulse mismatch (see A. Pfadler, P. Jung, and S. Stanczak, "Pulse-Shaped OTFS for V2X Short-Frame Communication with Tuned One-Tap Equalization," in WSA 2020; 24th Int. ITG Workshop on Smart Antennas, pp. 1-6, VDE, 2020) is taken into account.

II. OTFS SYSTEM MODEL. In this section, the system model and the OTFS transceiver structure is introduced. OTFS is a combination of classical pulse shaped multicarrier transmission with Gabor structure, i.e., TF translations on a regular grid in the TF plane, and additional TF spreading using the SFFT.

A. Time-Frequency Grid and Pulse Shaping. The frequency resolution is $$F = \frac{B}{M},$$

where B is the overall bandwidth and M the number of subcarriers. The time resolution is $$T = \frac{D}{N}$$

with D being the frame duration and N the number of time symbols. The TF grid is sampled with T and F period in the time and frequency domain, respectively. The filterbank length also depends on the dimensioning of the used synthesis and analysis pulse and the so-called time frequency product T·F. The Gabor filterbanks at the transmitter and at the receiver are configured with pulses $\gamma$ for the synthesis and g for the analysis of the signals, respectively.

Three cases are distinguished: TF>1, TF=1, and TF<1— sometimes referred to as undersampling, critical sampling, and oversampling of the TF plane, respectively K. Gröchenig, Foundations of time-frequency analysis. Springer Science & Business Media, 2013. Here, TF=1.25, is assumed, as it is a typical compromise between maximizing the signal to interference ratio (SIR) and the loss in degrees of freedom. See G. Matz, D. Schafhuber, K. Grochenig, M. Hartmann, and F. Hlawatsch, "Analysis, optimization, and implementation of low-interference wireless multicarrier systems," IEEE Trans. on Wireless Commun., vol. 6, no. 5, pp. 1921-1931, 2007. To guarantee perfect reconstruction in the non-dispersive and noiseless case, the pulses $\gamma$ and g may be required to be biorthogonal:

$$\langle \gamma, g_{nT,mf} \rangle = \delta(m)\delta(n) \quad (2)$$

where it is defined $g_{\alpha,\beta}(t)=g(t-\alpha)e^{j2\pi\beta t}$ (same for $\gamma_{\alpha,\beta}(t)$) with $\delta(0)=1$ and zero otherwise. Here, $$\langle u, v \rangle = \int u(t) \cdot v(t) dt$$

is used as inner product on $L_2(R)$, the Hilbert space of signals with finite energy. To ensure uncorrelated noise contributions, the synthesis and analysis pulses are assumed to be equal, resulting in an orthogonal pulse. Given a preliminary prototype pulse, the well-known S^-1/2-trick is used to perform the orthogonalization, i.e., constructing a tight Gabor frame on an adjoint lattice. See P. Jung and G. Wunder, "WSSUS pulse design problem in multicarrier transmission," IEEE Trans. on Commun., vol. 55, no. 10, pp. 1918-1928, 2007. However, exact orthogonality at the output of doubly dispersive channels is usually destroyed resulting in self-interference. By choosing different pulses for the transmitter and receiver, it may even be possible to further reduce the self-interference for classes of doubly dispersive channels.

B. TF-Spreading and De-Spreading. The transceiver structure is essentially the same as in many pulse shaped multicarrier schemes, like pulse-shaped OFDM, biorthogonal frequency division multiplexing (BFDM) or filter bank multicarrier (FBMC). A distinct feature of OTFS is the spreading. All symbols $X=\{X_{lk}\}_{(l,k) \in I}$, with $I \subseteq [M] \times [N]$, are pre-coded with the inverse SFFT denoted as $F_s^{-1}$. The SFFT differs from the ordinary 2D Fourier transformation by its sign switching in the exponent and coordinates swapping. One can interpret this by mapping an array of discrete DD positions (l, k) to an array of grid points (m, n) in the TF plane, since time shifts lead to oscillations in frequency and frequency shifts result in oscillations in time. More precisely, at the transmitter, the pre-coding is given by $$x=F_s^{-1}X=\{x_{mn}\}_{(m,n) \in I}$$

where $$x_{mn} = \frac{1}{\sqrt{NM}} \sum_{(l,k) \in I} X_{lk} e^{j2\pi\left(\frac{nk}{N} - \frac{ml}{M}\right)} \quad (3)$$

The received and equalized symbols $\hat{y}=\{\hat{y}_{mn}\}_{(m,n) \in I}$ in the TF plane are de-spreaded again as $\hat{Y}=\mathcal{F}_s\hat{y}$ such that $$\hat{Y}_{lk} = \frac{1}{\sqrt{NM}} \sum_{(m,n) \in I} \hat{y}_{mn} e^{-j2\pi\left(\frac{nk}{N} - \frac{ml}{M}\right)} \quad (4)$$

Figure 5:
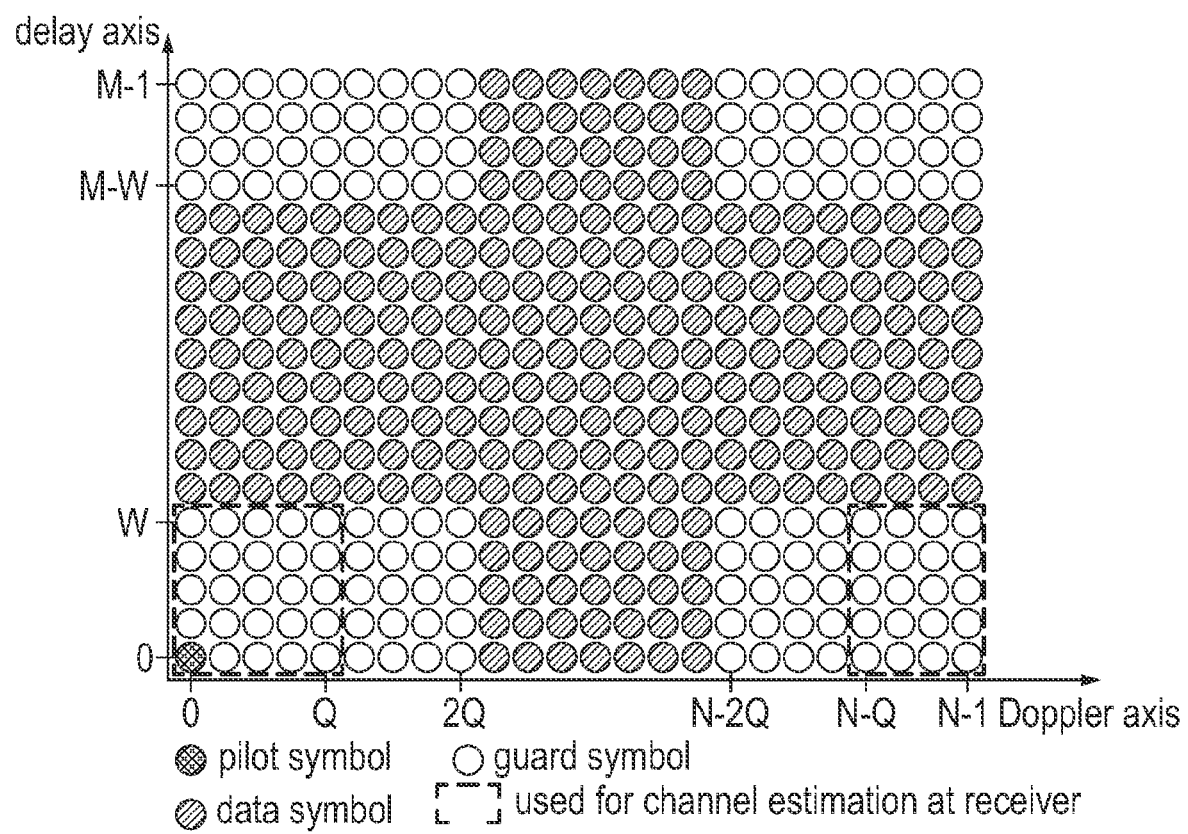
FIG. 5 illustrates an exemplary orthogonal time-frequency-and-space frame in a disclosed embodiment.

C. Structure of the OTFS Frames. A pilot-based channel estimation is used, where a pilot is inserted in the DD domain as proposed by R. Hadani and S. S. Rakib, "OTFS methods of data channel characterization and uses thereof," Sep. 13, 2016. U.S. Pat. No. 9,444,514. The pilot is sent by the transmitter in the same frame as the data. In doing so, the channel can be easily estimated at the receiver in the DD domain. The symbols to be placed in the DD domain are threefold. The data symbols, usually coming from a particular modulation alphabet, are placed on positions indexed by the set $D \subset I$. Positions used for channel estimation are defined by the set $P \subset I$, with $D \cap P = \emptyset$, which will contain a single pilot symbol; the other positions are unused and can be seen as guard symbols. In this context, it is assumed that $$P = \{(l, k): l \in [2W], k \in [4Q]\} \subset I \qquad (5)$$

where W and Q define the guard region in delay and Doppler domain, respectively. An arbitrary location $[l=\tau, k=2v]$ is used for the non-zero pilot symbol. Note that W and Q are defined with respect to the expected DD shift. See P. Raviteja, K. T. Phan, and Y. Hong, "Embedded Pilot-Aided Channel Estimation for OTFS in Delay-Doppler Channels," IEEE Trans. on Vehicular Technol., vol. 68, no. 5, pp. 4906-4917, 2019. FIG. 5 depicts an example of an OTFS frame with data, pilot, and guard symbols. Q and W are chosen with an appropriate dimension for each OTFS mode. A constant product of $Q \cdot W$, i.e., 1024 symbols is assumed, to compare different configurations with the same pilot overhead (same data rate). For simplicity, the non-zero pilot $X_{lk} = \sqrt{P_p}$ at $k=0$ and $l=0$ with the normalized power of $P_p = 2Q4W$ and all the other symbols in P are zero-valued guard symbols are set.

D. Gabor Synthesis Filterbank. The OTFS frame in the TF plane is then used to synthesize a transmit signal s(t). This is implemented with a Gabor synthesis filterbank configured with a transmit pulse γ. See W. Kozek, "Matched Weyl-Heisenberg expansions of nonstationary environments," 1996. This can be formally written as $$s(t) = \Sigma_{(m,n) \in I} \gamma(t - nT) e^{j2\pi mFt} x_{mn}, \ t \in \mathbb{R} \qquad (6)$$

E. The Doubly Dispersive Channel. For a doubly dispersive channel, the noiseless time-continuous channel output consists of an unknown linear combination of TF translates of the input signal s(t). This operation can be formally expressed as $$r(t) = \sum_{p=1}^{p_{max}} h(p)(t) s(t - \tau_p) = \sum_{(m,n) \in I} x_{mn} \sum_{p=1}^{p_{max}} h(p)(t) \gamma(t - \tau_p - nT) e^{j2\pi mF(t - \tau_p)} \qquad (7)$$

where the pth discrete propagation path has the delay $\tau_p$ for $p = 1 \ldots p_{max}$. The index set is defined by $\mathcal{A} := [1 \ldots d_{max}] \times [1 \ldots p_{max}]$. For $p \in \{1, p_{max}\}$, $h_p(t)$ is then given by $$h_p(t) = \Sigma_{d=1}^{d_{max}} S_{dp} e^{j2\pi t v_d} \qquad (8)$$

where $\{S_{dp}\}_{(d,p) \in \mathcal{A}}$ can be seen as the discrete DD spreading function. See P. Bello, "Characterization of randomly time-variant linear channels," IEEE Trans. on Commun. Syst., vol. 11, no. 4, pp. 360-393, 1963. In particular, this simplified model implies that each path has the same range of frequency shifts $\{v_d\}_{d=1}^{d_{max}}$ but with possibly different coefficients. The set of TF shifts $\{(v_d, \tau_p)\}_{(d,p) \in A} \subset U$ is assumed to be usually in a box $U := [-v_{max}, v_{max}] \times [0, \tau_{max}]$ of size $|U| = 2 v_{max} \tau_{max} \ll 1$, which is also known as the underspread assumption. Putting (6) in (7) with (8) yields $$r(t) = \sum_{(m,n) \in I} x_{mn} \sum_{(d,p) \in \mathcal{A}} S_{dp} \gamma(t - \tau_p - nT) \times e^{j2\pi mF(t - \tau_p)} e^{j2\pi t v_d} \qquad (9)$$

F. Gabor Analysis Filterbank. The received signal is down-converted and passed through an analysis filterbank. The output of the noiseless Gabor analysis filterbank in TF slot $(\bar{m}, \bar{n}) \in I$ is then $$y_{\bar{m}\bar{n}} = \qquad (10)$$
$$\langle g_{\bar{n}T, \bar{m}F}, r \rangle = \sum_{(m,n) \in I} x_{mn} \sum_{(d,p) \in \mathcal{A}} S_{dp} e^{-j2\pi \bar{m}F \tau_p} \times \langle g_{\bar{n}T, \bar{m}F}, \gamma_{\tau_p + nT, v_d + mF} \rangle$$

III. CHANNEL ESTIMATION AND SELF-INTERFERENCE. In this section, the channel estimation, the equalization and the amount of self-interference which remains in the OTFS transceiver structure is explained in more detail. In particular, the link between the equalization as a 2D-deconvolution and the true channel mapping, given as a twisted convolution, is shown.

A. Impact of the Self-Interference. To reveal the impact of pulse and grid mismatch on self-interference, the inner product in (10) is rewritten and computed separately:

$$\langle g_{\bar{n}T, \bar{m}F}, \gamma_{\tau_p + nT, v_d + mF} \rangle = \langle g_{\bar{n}T, 0}, \gamma_{\tau_p + nT, [m-\bar{m}]F + v_d} \rangle = \qquad (11)$$
$$e^{j2\pi([m-\bar{m}]F + v_d)\bar{n}T} \langle g_{\bar{n}T, 0}, \gamma_{\tau_p + nT + [\bar{n}-n]T, [m-\bar{m}]F + v_d} \rangle =$$
$$e^{j2\pi([m-\bar{m}]F + v_d)\bar{n}T} A([n-\bar{n}]T - \tau_p, [m-\bar{m}]F + v_d),$$

Where $A(\alpha, \beta) = \langle g, \gamma_{\alpha, \beta} \rangle$ is the cross-ambiguity function. The goal is to design the pulses γ and g such that $$A([n-\bar{n}]T - \tau_p, [m-\bar{m}]F + v_d) \approx \delta(n-\bar{n}) \delta(m-\bar{m}) A(\tau_p, v_d), \qquad (12)$$

for all values $(\tau_p, v_d) \in U \neq 0$. Roughly speaking, this implies that $\mathbb{E}(|z_{\bar{m}\bar{n}}|^2)$ (taken over data symbols and channel realizations) of the self-interference $z_{\bar{m}\bar{n}}$ defined to be $$z_{\bar{m}\bar{n}} := \sum_{(m,n) \neq (\bar{m},\bar{n})} x_{mn} S_{dp} \qquad (13)$$
$$e^{-j2\pi(\bar{m}F \tau_p - \bar{n}T v_d - [m-\bar{m}]F \bar{n}T)} A([n-\bar{n}]T - \tau_p, [m-\bar{m}]F + v_d)$$

becomes negligibly small. Note that $$\mathbb{E}(|z_{\bar{m}\bar{n}}|^2) > 0$$

since pulses g and γ such that $A_{g\gamma}(\alpha, \beta) = A_{g\gamma}(0) \delta(\alpha) \delta(\beta)$ for all the $(\alpha, \beta)$ do not exist. Therefore, the goal of matched pulse shaping is instead to minimize the expected self-interference power.

By considering self-interference in the system model, $$y_{\bar{m}\bar{n}} = x_{\bar{m}\bar{n}} \sum_{(d,p) \in \mathcal{A}} S_{dp} \cdot A_{g\gamma}(\tau, v) e^{-j2\pi(\bar{m}F \tau_p - \bar{n}T v_d)} + z_{\bar{m}\bar{n}} \qquad (14)$$

is obtained. Applying $\mathcal{F}_s$ to (14) shows that in the first order (up to inference) the channel acts as 2D-convolution since $$Y_{\bar{l}\bar{k}} = \frac{1}{\sqrt{NM}} \sum_{(\bar{m},\bar{n}) \in I} y_{\bar{m}\bar{n}} e^{-j2\pi\left(\frac{\bar{n}\bar{k}}{N} - \frac{\bar{m}\bar{l}}{M}\right)} = \qquad (15)$$

$$\frac{1}{\sqrt{NM}} \sum_{(\bar{m},\bar{n}) \in I} (h_{\bar{m}\bar{n}} x_{\bar{m}\bar{n}} + z_{\bar{m}\bar{n}}) e^{-j2\pi\left(\frac{\bar{n}\bar{k}}{N} - \frac{\bar{m}\bar{l}}{M}\right)}$$

$$=: \frac{1}{\sqrt{NM}} \sum_{(\bar{m},\bar{n}) \in I} (h_{\bar{m}\bar{n}} x_{\bar{m}\bar{n}}) e^{-j2\pi\left(\frac{\bar{n}\bar{k}}{N} - \frac{\bar{m}\bar{l}}{M}\right)} + Z_{\bar{l}\bar{k}}$$

As point-wise multiplication in the TF plane is (circular) 2D-convolution in the DD plane, $$Y_{\bar{l}\bar{k}} = \sqrt{NM}(H^*X)_{\bar{l}\bar{k}} + Z_{\bar{l}\bar{k}} \qquad (16)$$

where $H = \mathcal{F}_s h$ is the channel transfer function. The magnitude of $Z_{\bar{l}\bar{k}}$ is depending on the matching given in (12), i.e., the higher the mismatch the larger the self-interference.

B. Delay-Doppler Channel Estimation. The channel is estimated with the pilot sent by the transmitter in the DD domain. The $\mathcal{F}^{-1}$ applied to quarter of the guard area, where the channel impulse response (CIR) is obtained by P. Raviteja, K. T. Phan, and Y. Hong, "Embedded Pilot-Aided Channel Estimation for OTFS in Delay-Doppler Channels," IEEE Trans. on Vehicular Technol., vol. 68, no. 5, pp. 4906-4917, 2019:

$$\hat{h}_{\bar{m}\bar{n}} = \frac{1}{\sqrt{NM}} \sum_{\bar{l}=0, \bar{k}=N-Q}^{\bar{l}=W, \bar{k}=2Q} Y_{\bar{l}\bar{k}} e^{j2\pi\left(\frac{\bar{n}\bar{k}}{N} - \frac{\bar{m}\bar{l}}{M}\right)} + I_{\bar{m}\bar{n}}, \qquad (17)$$

for all $(\bar{m}, \bar{n}) \in I$. FIG. 5 highlights the symbols used for channel estimation in a black dashed frame. The remaining guard symbols (outside the black dashed frame) are used to avoid interference between the pilot and data symbols.

C. Time-Frequency Equalization. It is proposed to use mobility modes to achieve sufficient performance at moderate complexity. The appropriate mobility mode controls the self-interference on a coarse level. In addition, the MMSE equalizer is tuned to account for the remaining self-interference power. The received frame (14) is equalized with the estimated channel (17) by MMSE equalization:

$$\hat{y}_{\bar{m}\bar{n}} = \frac{\hat{h}_{\bar{m}\bar{n}}^* y_{\bar{m}\bar{n}}}{|\hat{h}_{\bar{m}\bar{n}}|^2 + \sigma^2 + \underbrace{\mathbb{E}_x\{|z_{\bar{m}\bar{n}}|^2 + |h_{\bar{m}\bar{n}} - \hat{h}_{\bar{m}\bar{n}}|^2\}}_{I}} \qquad (18)$$

where $\sigma^2$ is the noise variance. Therefore, it is the mean self-interference power I is estimated, which contains the averaged power of the self-interference and the error of the channel estimation at the receiver. This may be approached by estimating I as the empirical mean (over $(\bar{m}, \bar{n})$) from pilot and guard symbols for each frame to tune the MMSE equalizer instantaneously to the corresponding channel realization. For a given I, the equalized symbols in the DD domain are given by:

$$\hat{Y}_{\bar{l}\bar{k}}(I) = \frac{1}{\sqrt{NM}} \sum_{(\bar{m},\bar{n}) \in I} \frac{\hat{h}_{\bar{m}\bar{n}}^* y_{\bar{m}\bar{n}}}{|\hat{h}_{\bar{m}\bar{n}}|^2 + \sigma^2 + I} e^{-j2\pi\left(\frac{\bar{n}\bar{k}}{N} - \frac{\bar{m}\bar{l}}{M}\right)} \qquad (19)$$

An intuitive approach is then to minimize a given error metric $d(\cdot, \cdot)$ between the transmitted (assumed to be known at receiver) and equalized pilot and guard symbols, $X_{\bar{l}\bar{k}}$ and $\hat{Y}_{\bar{l}\bar{k}}$ respectively, as proposed in A. Pfadler, P. Jung, and S. Stanczak, "Pulse-Shaped OTFS for V2X Short-Frame Communication with Tuned One-Tap Equalization," in WSA 2020; 24th Int. ITG Workshop on Smart Antennas, pp. 1-6, VDE, 2020:

$$I_{opt} = \arg\min_{I \geq 0} \sum_{(\bar{k},\bar{l}) \in P} d(\hat{Y}_{\bar{l}\bar{k}}(I), X_{\bar{l}\bar{k}}) \qquad (20)$$

As error metric $d(a, b) \sim \|a-b\|_2$, the $\ell$ 2-norm is used on a finite grid as in A. Pfadler, P. Jung, and S. Stanczak, "Pulse-Shaped OTFS for V2X Short-Frame Communication with Tuned One-Tap Equalization," in WSA 2020; 24th Int. ITG Workshop on Smart Antennas, pp. 1-6, VDE, 2020. Finally, each frame is then equalized with its individual $I_{opt}$.

IV. MOBILITY MODES. In this section, the mobility modes are introduced to reduce the self-interference caused by grid and pulse mismatches. Coping with different channel conditions, i.e., distinct delay and Doppler spreads, seven different mobility modes are investigated. The mobility mode may be defined by the long-term expectation of the channel. The proposed mobility modes are aiming to yield a small deviation from equality in (12) and hence to reduce the impact of self-interference. The remaining self-interference power is then estimated in (20) and used for the linear equalization.

TABLE I

| Mode | N | M | T | F | T/F |
|---|---|---|---|---|---|
| OFDM | 64 | 64 | 0.125 μs | 156.25 kHz | 8e–13 |
| I | 64 | 64 | 0.125 μs | 156.25 kHz | 8e–13 |
| II | 32 | 128 | 0.5 μs | 79.125 kHz | 6.4e–12 |
| III | 128 | 32 | 31.25 ns | 312.5 kHz | 1e–13 |
| IV | 16 | 256 | 2 μs | 39.063 kHz | 5.12e–11 |
| V | 256 | 16 | 62.5 ns | 625 kHz | 1.25e–14 |
| VI | 8 | 512 | 8 μs | 19.531 kHz | 4.096e–10 |
| VII | 512 | 8 | 1.953 ns | 1250 kHz | 1.5625e–15 | presents the mobility modes I to VII. The higher the resolution in time (N symbols), the fewer resolution in frequency domain (M subcarrier) and vice versa. Mode I represents the case for equal time and frequency resolution. Each mobility mode therefore has its own pulse shape which is achieved by squeezing and orthogonalization according to the procedure explained in the introduction. It is assumed that the transmitter and the receiver use the same mode. The appropriate mode can be selected depending on the second order statistic of the channel. The selection of an appropriate mode is left for future work.

V. NUMERICAL RESULTS. In this section, the approach of using distinct mobility modes for grid and pulse matching is numerically analyzed.

TABLE II

SIMULATION AND SYSTEM PARAMETERS

| Parameter | Notation | Values | Unit |
|---|---|---|---|
| Carrier frequency | fc | 5.9 | GHz |
| Bandwidth | B | 10 | MHz |
| Modulation scheme | QPSK | — | — |
| TF product | TF | 1.25 | — |

TABLE II-continued

SIMULATION AND SYSTEM PARAMETERS

| Parameter | Notation | Values | Unit |
|---|---|---|---|
| Cyclic prefix | CP | 16 | — |
| Filter length | L | 5120 | — |
| OTFS pilot and guard symbols | QW | 1024 | — |
| OFDM pilots | O | 1024 | — |
| FEC Coding (soft-decision) | convolutional code | — | — |
| Code rate | r | 0.5 | — |
| Channel model V2I | 3GPP 38.901 | — | — |
| Channel model V2V | QuaDRIGa UD2D | — | — | summarizes the parameters used to obtain the numerical results. In the case of cyclic prefix (CP) based OFDM, the regularized least-squares approach is followed for channel estimation and zero-forcing equalization (see P. Jung, W. Schuele, and G. Wunder, "Robust path detection for the LTE downlink based on compressed sensing," in 14th Int. OFDM-Workshop, Hamburg, 2009) is used. One OFDM configuration is studied, with the same TF grid as OTFS Mode I (see Table I). The OFDM configuration is close to the 802.11p standard where the rectangular pulses include the CP. The coded BER curves are presented for different communication scenarios for all modes, where convolution codes with a code rate of r=0.5 are used.

TABLE III

OVERVIEW OF MOBILITY MODES FOR DIFFERENT V2X SCENARIOS AND MINIMUM SNR NEEDED TO REACH THE TARGET BER OF $10^{-2}$ AND $10^{-3}$.

Figure 6:
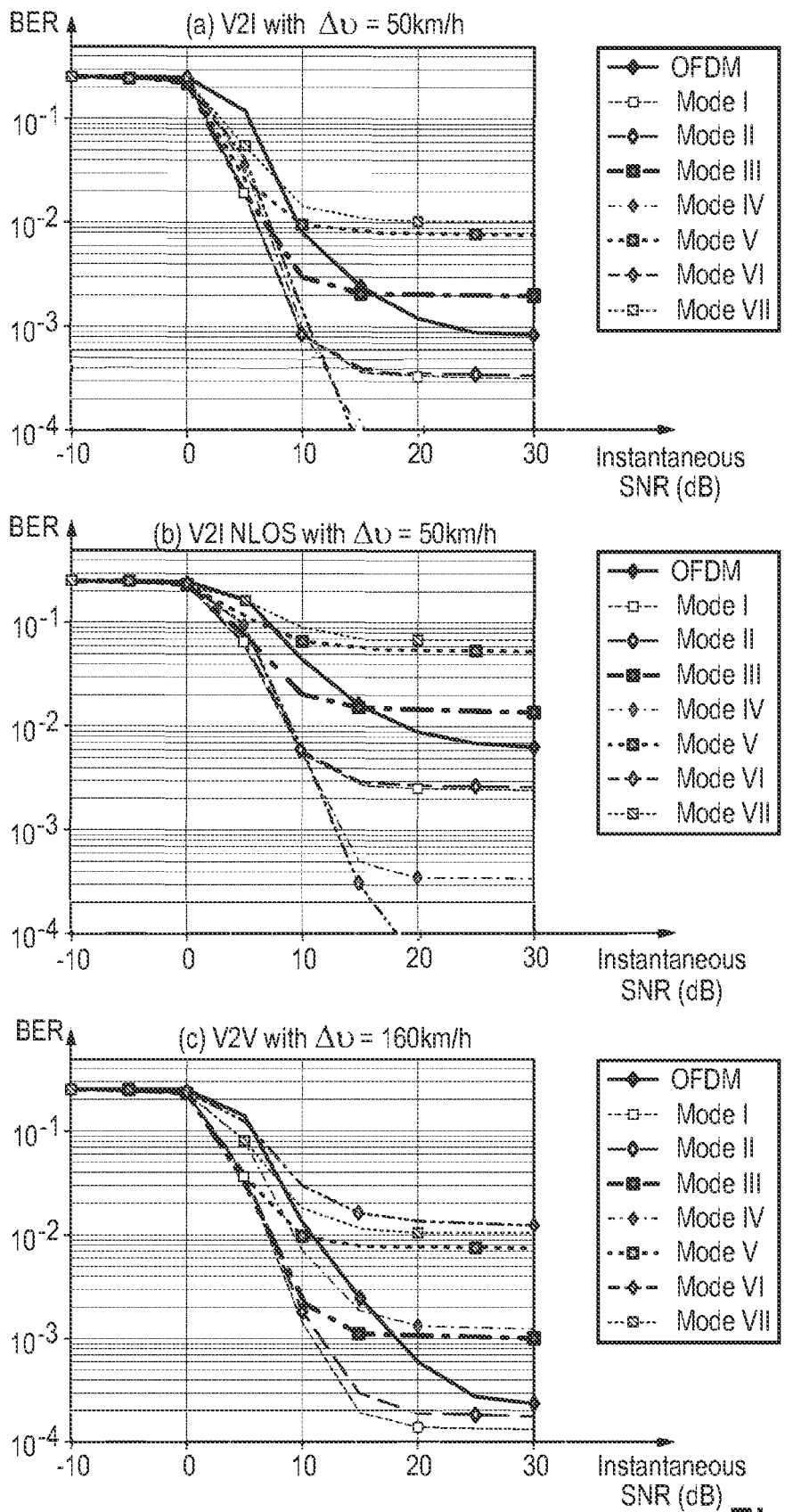
FIG. 6 illustrates bit-error-rates in an exemplary embodiment for different V2X scenarios.

| V2X scenario | Target BER | OFDM | Mode I | Mode II | Mode III | Mode IV | Mode V | Mode VI | Mode VII |
|---|---|---|---|---|---|---|---|---|---|
| V2I $\Delta v =$ 10 km/h | $10^{-2}$ | 9.9 dB | 7.3 dB | 7.1 dB | 7.7 dB | 8.3 dB | 9.7 dB | 8.2 dB | 19.2 dB |
| | $10^{-3}$ | 22.7 dB | — | 9.8 dB | — | dB | — | dB | — |
| | lowest BER | 0.8e-3 | 0.2e-3 | 0.2e-3 | 1.9e-3 | 0 | 7.2e-3 | 0 | 9.8e-3 |
| V2I (NLOS) $\Delta v =$ 10 km/h | $10^{-2}$ | 19.5 dB | 9.7 dB | 9.7 dB | — | 9.7 dB | — | 9.6 dB | — |
| | $10^{-3}$ | — | — | — | — | 14.4 dB | — | 13.6 dB | — |
| | lowest BER | 6.8e-3 | 3e-3 | 3.2e-3 | 15.1e-3 | 0.5e-3 | 53.1e-3 | 0 | 67.5e-3 |
| V2I $\Delta v =$ 50 km/h | $10^{-2}$ | dB | 7.6 dB | 7.6 dB | 7.9 dB | 8.7 dB | 9.9 dB | dB | — |
| | $10^{-3}$ | 23.4 dB | 10 dB | 10 dB | — | 10 dB | — | 11.6 dB | — |
| | lowest BER | 0.8e-3 | 0.3e-3 | 0.3e-3 | 2e-3 | 0.1e-3 | 7.7e-3 | 0 | 10.2e-3 |
| V2I (NLOS) $\Delta v =$ 50 km/h | $10^{-2}$ | 19.1 dB | 9.7 dB | 9.7 dB | — | 9.8 dB | — | 9.8 dB | — |
| | $10^{-2}$ | — | — | — | — | 14.5 dB | — | 14.5 dB | — |
| | lowest BER | 6.3e-3 | 2.5e-3 | 2.6e-3 | 13.7e-3 | 0.3e-3 | 53.1e-3 | 0 | 67.6e-3 |
| V2I $\Delta v =$ 100 km/h | $10^{-2}$ | dB | 8.2 dB | 8.4 dB | 8.3 dB | 9.5 dB | dB | 13.5 dB | — |
| | $10^{-3}$ | — | 12.4 dB | 12.7 dB | — | 14.4 dB | — | — | — |
| | lowest BER | 1.1e-3 | 0.5e-3 | 0.5e-3 | 2.4e-3 | 0.3e-3 | 7.9e-3 | 4.7e-3 | 10.3e-3 |
| V2I (NLOS) $\Delta v =$ 100 km/h | $10^{-2}$ | 19.6 dB | 9.9 dB | 9.9 dB | — | 11.1 dB | — | 14.6 dB | — |
| | $10^{-3}$ | — | — | — | — | 19.9 dB | — | — | — |
| | lowest BER | 7.4e-3 | 3.5e-3 | 3.8e-3 | 15.4e-3 | 0.8e-3 | 54.6e-3 | 40e-3 | 69e-3 |
| V2I $\Delta v =$ 260 km/h | $10^{-2}$ | dB | 7.8 dB | 7.9 dB | dB | 9.1 dB | 9.8 dB | 9.8 dB | — |
| | $10^{-3}$ | — | 10.9 dB | 11.2 dB | — | 12.6 dB | — | 20.6 dB | — |
| | lowest BER | 1.1e-3 | 0.4e-3 | 0.5e-3 | 2.2e-3 | 0.1e-3 | 7.6e-3 | 0.8e-3 | 10.1e-3 |
| V2V $\Delta v =$ 90 km/h | $10^{-2}$ | 11.4 dB | 8.9 dB | 9.1 dB | 8.7 dB | dB | dB | — | — |
| | $10^{-3}$ | 19.5 dB | 12.5 dB | 13.8 dB | — | — | — | — | — |
| | lowest BER | 0.2e-3 | 0.1e-3 | 0.3e-3 | 1.1e-3 | 1.4e-3 | 7.5e-3 | 16.6e-3 | 10.3e-3 |
| V2V $\Delta v =$ 160 km/h | $10^{-2}$ | 11.7 dB | 8.9 dB | dB | 8.7 dB | 9.9 dB | dB | — | — |
| | $10^{-3}$ | 18.9 dB | 11.7 dB | 12.7 dB | — | — | — | — | — |
| | lowest BER | 0.2e-3 | 0.1e-3 | 0.2e-3 | 1e-3 | 1.2e-3 | 7.4e-3 | 12.7e-3 | 10.3e-3 | lists all modes and the corresponding signal to noise ratio (SNR) needed to reach the target BER of $10^{-2}$ and $10^{-3}$. The lowest BER reached for each mode is listed. FIGS. 3d to 3f show the BER for distinct V2X scenarios and different mobility modes. The QuaDRIGa channel simulator (see S. Jaeckel, L. Raschkowski, K. Börner, and L. Thiele, "QuaDRiGa: A 3-D multi-cell channel model with time evolution for enabling virtual field trials," IEEE Trans. on Antennas and Propag., vol. 62, no. 6, pp. 3242-3256, 2014) with the 3GPP 38.901 and QuaDRIGa UD2D channel model for V2I and V2V scenarios is used, respectively. The convolution coding is using a code rate of r=0.5. FIGS. 6a and b depict the BER for the vehicle-to-infrastructure (V2I) scenario under line-of-sight (LOS) and strict non line-of-sight (NLOS) condition, respectively. Each V2X scenario is characterized by a distinct DD spread. Therefore, for each case, a different mobility mode is appropriate, i.e., Mode I or II in LOS and Mode VI or IV in NLOS. In FIG. 6c, a vehicle-to-vehicle (V2V) scenario is presented with a relative speed of $\Delta v=160$ km/h. Here Mode I outperforms the others. In general, it can be observed that OTFS outperforms OFDM with an appropriate mobility mode in all scenarios.

VI. CONCLUSIONS. Mobility modes were introduced for pulse-shaped OTFS modulation to enable linear equalization. By selecting an appropriate mobility mode for pulse and grid matching the self-interference level, immanent in doubly dispersive channels, reduces and hence, also the BER. It can be concluded that through the introduction of mobility modes, one can improve the system performance for low-complexity equalizers implementing tuned 2D-deconvolutions instead of dealing with the full twisted convolution. It is pointed out that the tuning of the equalizer for the remaining interference levels provides further gains of the mobility modes. For each V2X scenario a distinct mobility mode outperforms the others and the effect improves with more accurate channel knowledge. In all scenarios at least one OTFS mode outperforms the CP-based OFDM. It is shown the importance of the selection of an appropriate mobility mode.

Examples may further be or relate to a computer program having a program code for performing one or more of the above methods, when the computer program is executed on a computer or processor. Operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed to furthering the art. All statements herein reciting principles and examples of the disclosure, as well as specific examples thereof, are intended to encompass equivalents thereof.

A functional block denoted as "means for . . ." performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented as dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes or operations, which may, for instance, be substantially represented in computer readable medium and so executed by a computer or processor, whether or not such computer or processor is explicitly shown. Methods disclosed in the specification or in the claims may be implemented by a device having methods or mechanisms for performing each of the respective acts of these methods.

It is to be understood that the disclosure of multiple acts, processes, operations, or functions disclosed in the specification or claims may not be construed as to be within the specific order, unless explicitly or implicitly stated otherwise, for instance, for technical reasons. Therefore, the disclosure of multiple acts or functions will not limit these to a particular order unless such acts or functions are not interchangeable for technical reasons. Furthermore, in some examples a single act, function, process or operation may include or may be broken into multiple sub-acts, -functions, -processes, or -operations, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

REFERENCE LIST 10 method for determining a delay-Doppler-resolution, DDR, for a transceiver of a mobile communication system
12 determining information on properties of the transceiver
14 selecting the DDR from a database based on the information on the properties of the transceiver
20 apparatus
22 transceiver module/interface
24 processing module
24a scheduler/resource allocation module 24a
24b DDR selection module
26 database
100 transceiver
200 transceiver/base station
300 communication system

What is claimed is:

1. A method for determining a delay-Doppler-resolution (DDR) to provide adaptive radio performance for a transceiver of a mobile communication system, the method comprising:
   determining information on properties of the transceiver;
   selecting the DDR from a database based on the information on the properties of the transceiver;
   using the DDR for radio communication with the transceiver in the mobile communication system, wherein the radio communication uses orthogonal time frequency and space (OTFS) multiplexing;
   determining information on transceiver communication performance of the radio communication that uses OTFS multiplexing; and
   tracking transceiver communication performance to determine how to adapt the DDR to further improve the transceiver communication performance to provide adaptive radio performance.

2. The method of claim 1, further comprising improving the DDR based on the radio performance and updating the database.

3. The method of claim 2, further comprising using artificial intelligence for improving the DDR based on the radio performance.

4. The method of claim 1, wherein the information on the communication performance comprises information on a quality of service on a radio link.

5. The method of claim 1, wherein the information on a communication performance comprises information on a diversity gain on the a radio link for the DDR.

6. The method of claim 1, wherein the information on the properties comprises information on a velocity of the transceiver.

7. The method of claim 1, wherein the information on the properties comprises information on a geographical position of the transceiver.

8. The method of claim 1, wherein the information on the properties comprises information on a predicted trajectory of the transceiver.

9. The method of claim 1, wherein the information on the properties comprises information on a transmitter and/or receiver setup of the transceiver.

10. The method of claim 1, further comprising scheduling time and frequency resources to the transceiver, and wherein the selecting further comprises selecting the DDR based on the time and frequency resources.

11. The method of claim 1, further comprising receiving user data from the transceiver, the user data at least partly comprising the information on the properties.

12. A non-transitory computer readable medium including a computer program having a program code for performing the method claim 1, when the computer program is executed on a computer, a processor, or a programmable hardware component.

13. An apparatus for determining a delay-Doppler-resolution (DDR) to provide adaptive radio performance for a transceiver of a mobile communication system, the apparatus comprising:
   a transceiver module for communicating in the mobile communication system; and
   a processing module determine the DDR for the transceiver by determining information on properties of the transceiver, selecting the DDR from a database based on the information on the properties of the transceiver, using the DDR for radio communication with the transceiver in the mobile communication system, wherein the radio communication uses orthogonal time frequency and space (OTFS) multiplexing, determining information on transceiver communication performance of the radio communication that uses OTFS multiplexing, and tracking transceiver communication performance to determine how to adapt the DDR to further improve the transceiver communication performance to provide adaptive radio performance.

14. The apparatus of claim 13, wherein the processing module improves the DDR based on the radio performance and updates the database.

15. The apparatus of claim 14, wherein the processing module uses artificial intelligence to improve the DDR based on the radio performance.

16. The apparatus of claim 13, wherein the information on the communication performance comprises information on a quality of service on a radio link.

17. The apparatus of claim 13, wherein the information on a communication performance comprises information on a diversity gain on a radio link for the DDR.

18. The apparatus of claim 13, wherein the information on the properties comprises information on a velocity of the transceiver.

19. The apparatus of claim 13, wherein the information on the properties comprises information on a geographical position of the transceiver.

20. The apparatus of claim 13, wherein the information on the properties comprises information on a predicted trajectory of the transceiver.

21. The apparatus of claim 13, wherein the information on the properties comprises information on a transmitter and/or receiver setup of the transceiver.

22. The apparatus of claim 13, wherein the processing module schedules time and frequency resources to the transceiver, and wherein the selection selects the DDR based on the time and frequency resources.

23. The apparatus of claim 13, wherein the processing module receives user data from the transceiver, the user data at least partly comprising the information on the properties.

* * * * *